United States Patent [19]

Schultz

[11] Patent Number: 5,265,522
[45] Date of Patent: Nov. 30, 1993

[54] APPARATUS FOR SIGNALLING THE OPERATING CONDITION OF A COOKING VESSEL

[75] Inventor: Horst Schultz, Massenheim, Fed. Rep. of Germany

[73] Assignee: ALFA Institut für Hauswirtschaftliche Produkt und Verfahrens-Entwicklung GmbH, Eltville am Rhein, Fed. Rep. of Germany

[21] Appl. No.: 423,036

[22] Filed: Oct. 18, 1989

[30] Foreign Application Priority Data

Oct. 18, 1988 [DE] Fed. Rep. of Germany ....... 3835386

[51] Int. Cl.$^5$ ............................................. A47J 27/00
[52] U.S. Cl. ........................................ 99/343; 99/342; 99/344; 340/584; 374/149
[58] Field of Search ................... 99/342, 344, 343; 340/584, 678, 693; 116/102, 221; 374/149, 150, 141, 188, 206

[56] References Cited

U.S. PATENT DOCUMENTS

| 2,039,477 | 5/1936 | Edgar | 99/343 |
| 2,159,068 | 5/1939 | Young | 99/342 |
| 2,254,570 | 9/1941 | Hailey | 99/343 |
| 2,833,149 | 5/1958 | Aldridge et al. | 99/342 |
| 3,068,408 | 12/1962 | Lovegrove | 340/678 X |
| 3,445,677 | 5/1969 | Leftwich | 374/188 X |
| 3,736,861 | 6/1973 | Kroyer et al. | 99/343 |
| 4,509,868 | 4/1985 | Ronconi et al. | 99/342 |
| 4,571,580 | 2/1986 | Winteler et al. | 99/342 X |
| 4,805,188 | 2/1989 | Parker | 99/342 |
| 4,982,655 | 1/1991 | Wen-der et al. | 99/337 |

FOREIGN PATENT DOCUMENTS

| 280607 | 4/1965 | Australia | 99/342 |
| 1465022 | 1/1969 | Fed. Rep. of Germany . | |
| 7393285 | 5/1973 | Fed. Rep. of Germany . | |
| 2454203 | 5/1976 | Fed. Rep. of Germany . | |
| 2909129 | 9/1980 | Fed. Rep. of Germany . | |
| 3437121 | 4/1986 | Fed. Rep. of Germany . | |
| 2529068 | 12/1983 | France | 99/337 |
| 2535190 | 5/1984 | France . | |
| 138779 | 10/1979 | Japan | 99/342 |

OTHER PUBLICATIONS

Bobar, S., R. E. Ellis, H. O. Winters, "Dial Micrometer", IBM Technical Disclosure Bulletin vol. 13, No. 8, Jan. 1971 p. 2245.

Huang, S. S., R. R. Scroxton, "Bent Pin Detection Device", IBM Technical Disclosure Bulletin vol. 10, No. 5, Oct. 1967, p. 585.

Grief, H., "Lichtelektrischer Grenzkontaktgeber für Zeigermessgeräte", msr. 7 ap (1964) H. 4.

Primary Examiner—Harvey C. Hornsby
Assistant Examiner—Mark Spisich
Attorney, Agent, or Firm—Wenderoth, Lind & Ponack

[57] ABSTRACT

An apparatus for signalling an operating condition of a cooking vessel is provided to signal a user of the cooking vessel when a preset condition is reached in the cooking vessel, e.g. temperature or pressure. Cooking vessels are frequently provided with an operating condition display device, such as a thermometer or a pressure gauge, which have a measurement scale and an indicator element moving relative to the measurement scale to indicate the internal condition of the cooking vessel. The apparatus of the present invention provides a housing having therein a detector for detecting a change in the reflected surface light from the operating condition display device caused by the presence of the indicator element of the display device. When the detector detects the change in the reflected light due to the presence of the indicator element, a signalling device, such as an acoustical or optical signalling device, is activated to signal the user of the cooking vessel. The apparatus can be set along the measurement scale at a desired operating condition, such as a specific temperature or pressure, so that the user is warned when the cooking vessel reaches this condition.

6 Claims, 2 Drawing Sheets

APPARATUS FOR SIGNALLING THE OPERATING CONDITION OF A COOKING VESSEL

BACKGROUND OF THE INVENTION

(1) Field of the Invention

The present invention relates to an apparatus for indicating and signalling to a user of a cooking vessel a specific operating condition of the cooking vessel. More particularly, the present invention relates to an apparatus for signalling an operating condition, such as the temperature or pressure in a cooking vessel, by an optical or acoustical signal which can be perceived by the user of the cooking vessel at a remote distance. More specifically, the present invention relates to an apparatus for signalling an operating condition of a cooking vessel by detecting the movement of an indicating element relative to a measurement scale of a thermometer or pressure gauge at a specified point on the thermometer or pressure gauge display.

(2) State of the Prior Art

Devices are known for the electrical signalling and display of boiling temperatures, for instance from DE-OS 29 09 129. A knob of the lid of the cooking vessel of this specification has on its outer peripheral surface at least two contact rings insulated from one another. As a function of the cover temperature, an electrical circuit for generating a signal is closed by a switch. This is arranged in the lid knob by means of a contact device which can be mounted with the contact rings and a power supply and display unit. The switch is designed as a Hall switch, and an indicator of a bimetal spiral has a magnet. This known device assumes that the conductors have good contacts. Furthermore, a structural change to the already existing thermometers, for example the installation of magnets and contact rings, is required in order to be able to signal a specific operating state, such as a specific temperature having been reached for the purpose of switching a heat source to a lower temperature level for the remaining cooking time.

SUMMARY OF THE INVENTION

Accordingly, the objects of the present invention are to provide an apparatus for signalling an operating condition of a cooking vessel which is relatively simple in construction and operates more reliably than the devices known in the prior art. It is a further object of the present invention to provide such an apparatus which can be retrofitted onto existing temperature or pressure indicating devices without having to redesign these devices.

The above objects are achieved by the present invention by the provision of a reflected light barrier or switch for detecting an indicator element of an operating condition display device and providing a signal from a signalling device in response to the detection of reflected light by the reflected light barrier or switch. More specifically, the reflected light barrier detects the difference in the surface reflected light due to the indicator element of the operating condition display device moving into the path of the reflected light going to the reflected light barrier. Preferably, the reflected light barrier or switch is directed or focused toward a plane of movement of the indicator element, and more preferably in the direction of a measurement scale of the operating condition display device, the indicator element moving relative to the measurement scale.

Preferably, the reflected light barrier also has a light guide for guiding the reflected light to the reflected light barrier. Furthermore, the light guide preferably has a light guide opening to be directed toward the plane of movement of the indicator element.

Furthermore, the signalling device is preferably one which can deliver an optical signal and/or an acoustical signal to the user of the cooking vessel. A housing is also provided in order to house the reflected light barrier and the light guide, together hereafter known as the detector, as well as the signalling device. A power supply is also provided in the housing for powering both the detector and the signalling device.

Furthermore, the housing is preferably structurally arranged and designed so that the apparatus as a whole can be retrofitted and removably mounted on a display device of a cooking vessel. The housing is also designed to be movable relative to the operating display device in order to be able to set the detector at different points on the operating display for different values of operating conditions to be detected. In a preferred form of the present invention, the housing is designed so as to be fittable onto a display device that is positioned in a lid knob of the cooking vessel. More specifically, a first embodiment of the present invention provides for a contoured shape of the housing so as to be fittable into a peripheral recess of the lid knob of the cooking vessel. In a second embodiment of the present invention, the housing is shaped in the form of a ring to be fittable onto the top of the lid knob of the cooking vessel and to be rotatable thereon. In both of the above preferred embodiments, the light guide projects from the housing to a point facing toward the scale of the operating condition display device.

A further preferred feature of the present invention resides in making the housing of the apparatus out of plastic.

In operation, by determining the difference in the surface reflection due to the indicator entering into the light path of the surface reflected light going to the light guide, and thus the reflected light barrier, a signal is delivered to the signalling device in order to provide for the signal to the user of the cooking vessel.

The apparatus of the present invention has the advantage of being able to be attached to any arbitrary operating condition display device, such as a dial thermometer or a pressure gauge, already on a cooking vessel without having to modify the operating condition display device. It is thus possible to provide many different types of cooking vessels in use today with the apparatus for signalling an operating condition of the present invention. Furthermore, because no electrical switches are required to be actuated and there are no electrical contact transitions which must be maintained, the construction of the device is relatively simple and functions very reliably.

The apparatus for signalling an operating condition of a display device of a cooking vessel of the present invention has the further advantage of being mountable on a lid knob of the cooking vessel in different positions either on the periphery of the lid knob or on the top of the lid knob. This enables the user of the apparatus to set a desired operating condition of the cooking vessel, such as a specific temperature, at which the user desires a signal to be indicated. For example, a user might set the apparatus at a specific temperature for the purpose of indicating when the heat going to the cooking vessel should be reduced or turned off.

Another advantage of the present invention arises in that by the provision of either the contour design of the housing for fitting on a peripheral recess of the lid knob, or the ring design for disposition on top of the lid knob, in both cases the light guide is automatically correctly positioned over the measurement scale of the operating condition display device in the lid knob.

It should be noted that while the present invention has the advantage of being simply and quickly attached and removed from an operating condition display device of the cooking vessel, allowing selective use of the device on a cooking vessel, and allowing the apparatus to be retrofitted onto known cooking vessels, the apparatus of the present invention could also, as would be clear to those of ordinary skill in the art, be made a part of the operating condition display device in the first instance, i.e. when the cooking vessel is manufactured.

The present invention has the additional advantage in that, by making the housing of plastic, as noted above, the components of the invention embedded therein are thermally insulated against the temperatures prevailing inside the cooking vessel.

BRIEF DESCRIPTION OF THE DRAWINGS

Further objects, features, advantages and applications of the present invention will be apparent to those of ordinary skill in the art from the following description of the preferred embodiments of the present invention with reference to the accompanying drawings, wherein.

DESCRIPTION OF THE PREFERRED EMBODIMENTS

Figure 1:
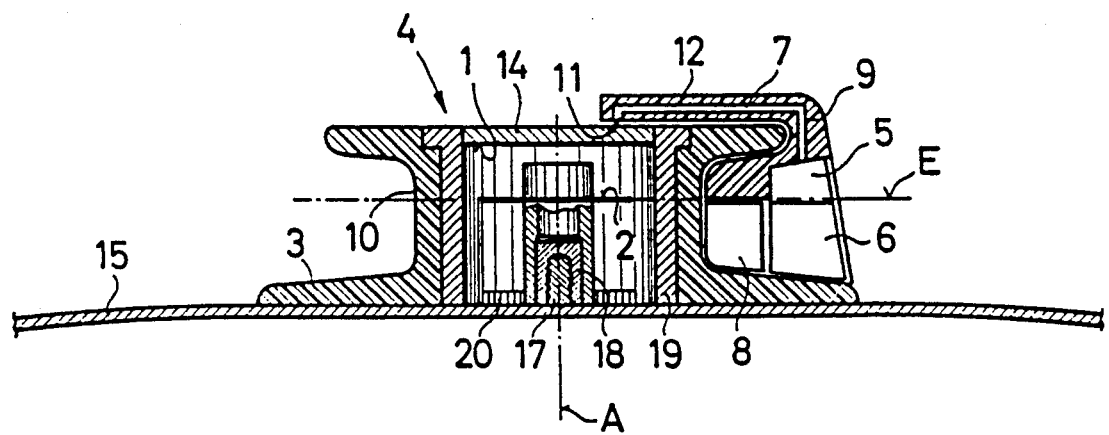
FIG. 1 is a cross-sectional and elevational view of an apparatus for signalling an operating condition of a cooking vessel, shown on a cooking vessel, according to a first embodiment of the invention.

FIG. 1 shows a cover 15 of a cooking vessel having a lid knob 3 connected thereto by a screw 17 attached to the cover 15 and a nut 18 fixed in the lid knob 3. The lid knob 3 has a substantially cylindrical recess within which is housed an operating condition display device 4. For purposes of the present invention, all that is required from the operating condition display device is that it have an indicating element movable in response to the operating condition to be detected. As a specific example, a temperature measurement operating condition display device is shown.

A metal insert 19 is received in the substantially cylindrical recess of the lid knob 3. The metal insert 19 has a transparent upper face 14 for viewing a temperature indicator element 2 therethrough. A measurement scale is also provided in the display device 4, and may preferably be provided on the underside of the transparent upper face 14. The indicator element 2 is movable relative to the measurement scale 1 in a plane E to provide an indication of the internal temperature of the cooking vessel. The indicator element 2 is moved by a bimetal spiral 20 in response to changes in temperature, the bimetal spiral 20 being permanently connected to the upper surface of the cooking vessel cover 15. Thus as the internal temperature of the cooking vessel changes, the temperature of the cover 15 is similarly affected and the spiral 20 moves the indicator element 2.

The apparatus for signalling an operating condition of the cooking vessel of the present invention is provided with a housing 9. Preferably, this housing is made of plastic. The housing 9 is structurally designed and arranged so as to be attachable to, movable relative to and removable from the operating condition display device. It should be noted that the operating condition display device need not necessarily be in a lid knob of the cooking vessel, but could be on some other portion of the cooking vessel. The housing 9 would then have its structure appropriate for the location and structure of the operating condition display device and for meeting the above criteria. As shown in FIG. 1 according to the first embodiment of the present invention, the housing 9 is contoured to fit into a peripheral groove 10 of the lid knob 3, and is then clamped onto a shaft of the lid knob 3. The housing 9 can be inserted into the recess 10 at any point on the periphery of the lid knob, and can also be rotated about an axis A relative to the lid knob 3 so that the housing can be set at any particular point on the periphery of the lid knob to place the apparatus at any particular point on the measurement scale 1. The housing 9 can also be removed from the lid knob 3.

A detector is provided in the housing for detecting reflected light from the operating condition display device 4. Preferably, the detector comprises a light guide 7, which extends through a projection or section 12 of the housing 9, and a reflected light barrier or switch, or photoreflector element switch, 5 for actually detecting the change in the surface reflected light from light reflecting surfaces of the operating condition display device. The reflected light barrier or switch 5 is a known device which receives light, and is able to detect a change in the reflected light received and provide a signal in response thereto. Those of ordinary skill in the art will readily understand the nature and operation of the reflected light barrier or switch 5. A signalling device 6 is also provided in the housing 9 for providing a signal in response to the detection by the reflected barrier or switch 5 of an appropriate change in the surface reflected light and, in response thereto, provide a signal to a user of the cooking vessel.

Figure 3:
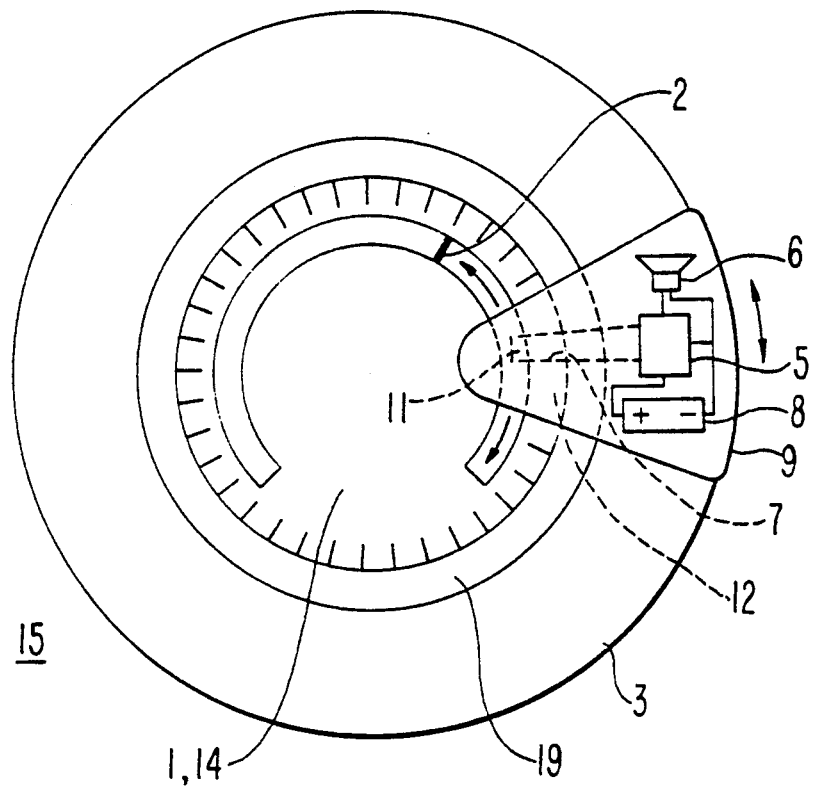
FIG. 3 is a partially schematic top view of the embodiment of FIG. 1.
Figure 4:
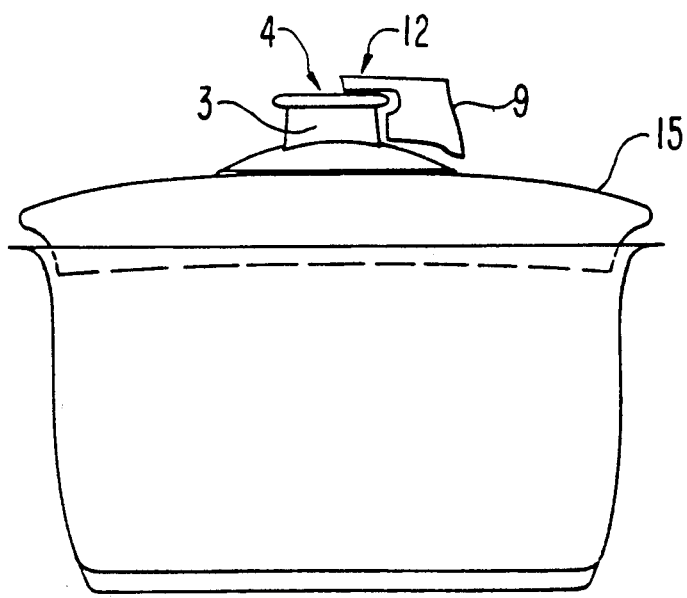
FIG. 4 is a side view of the embodiment of FIG. 1 on a cooking vessel.

Note that the section 12 of the housing 9 projects over the transparent upper face 14 of the operating condition display device 4. The light guide 7 has a light guide opening 11 which is thereby disposed above the measurement scale 1 and directed toward the plane of movement E of the indicating element 2. Furthermore, a power supply 8 is preferably provided in the housing for providing power to both the reflected light barrier or switch 5 and the signalling device 6. Also note that the signalling device 6 could be an acoustical signalling device or an optical signalling device, as well as any other appropriate form of device that signals a user in an appropriate fashion. See also FIG. 3.

In operation, continuing with the example of the present invention signalling a specified temperature of a cooking vessel, the housing 9 is, first of all, mounted on the lid knob 3 of the cooking vessel. The user of the cooking vessel will then rotate the housing 9 about the lid knob 3 in order to place the light guide opening 11 of the light guide 7 at a temperature position along the measurement scale 1 at which a signal is desired. Such a signal might be desired, for example, to indicate to the user the need for reducing the quantity of heat supplied to the cooking vessel, etc. As a cooking process begins, with respect to the cooking vessel, the indicator element 2 will move from its relatively cool starting temperature toward the preset signalling temperature. If and when the indicator element 2 moves beneath the light guide opening 11 of the light guide 7, the amount of surface reflected light reaching the reflected light barrier or switch 5 is changed. The resulting difference in the surface reflected light is detected by the reflected light barrier or switch 5, and an appropriate signal is provided to the signalling device 6. The desired signal is then, accordingly, triggered. When the apparatus for signalling an operating condition of the cooking vessel according to the present invention is not in use, it can be removed from the lid knob 3 and stored separately.

Figure 2:
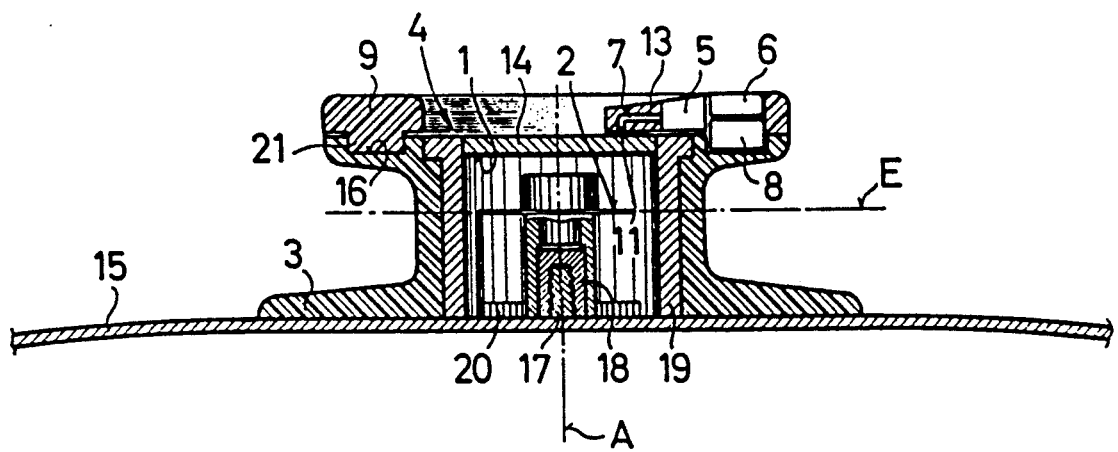
FIG. 2 is a cross-sectional and elevational view of a second embodiment of the apparatus for signalling an operating condition of a cooking vessel according to the present invention.

FIG. 2 illustrates a second preferred embodiment of the apparatus for signalling an operating condition of the cooking vessel according to the present invention. In operation, the embodiment of FIG. 2 is exactly the same as the apparatus of FIG. 1, but the structure of the device is slightly different. In the second embodiment, the housing 9 is in the shape of a ring and is provided with a rib 21 on the underside thereof. The rib 21 can be mounted on and locked into an annular T-slot 16 on the upperside of the lid knob 3. As can be seen from the figure, the locations of the reflected light barrier or switch 5, the signalling device 6 and the power supply 8 are altered in FIG. 2 in accordance with the ring shape of the housing 9. A projection or section 13 of the housing 9 similarly has the light guide 7 therein with the light guide opening 11 facing toward the measurement scale 1. The housing 9, shaped as a ring, can then be rotated on the top of the lid knob 3 to set the appropriate detecting position.

Note that with both of the above-described embodiments, for frequently desired detecting positions on the operating condition display device 4, locking positions can be provided between the housing 9 and the operating condition display device so that the housing 9 can be brought to these desired positions in a simple manner and can be prevented from being unintentionally shifted out of the positions. With the above embodiments, the locking positions can be provided between the lid knob 3 and the housing 9.

It will be apparent to those of ordinary skill in the art that the above described signalling apparatus need not be confined to uses on an operating condition display device of a cooking vessel, but could be used on operating condition display devices used for many different purposes without departing from the scope of the present invention.

Furthermore, although the present invention has been described and illustrated with respect to preferred features thereof, it is to be understood that various modifications and changes may be made to the specifically described and illustrated features without departing from the scope of the present invention.

We claim:

1. An apparatus for signalling an operating condition of a cooking vessel, comprising:
   a cooking vessel;
   an operating condition display device on said cooking vessel having a measurement scale and a relatively movable indicator element movable to indicate an operating condition of said cooking vessel by its position relative to the measurement scale, said operating condition display device further including a light reflective surface;
   a detecting means for receiving and detecting light reflected from said operating condition display device and for detecting the change in the reflected light due to the presence of said indicator element as it moves to a predetermined position with respect to the measurement scale, said detecting means comprising a photoreflector element switch;
   a signalling means for providing a signal to a user of said cooking vessel in response to said detecting means detecting the presence of said indicator element by detecting a change in the reflected light;
   said indicator element having a plane of movement;
   said detecting means further comprising a light guide for guiding light to said photoreflector element switch, said light guide having a light guide opening directed towards said plane of movement of said indicator element of said operating condition display device;
   a power supply connected to said detector and said signalling means; and
   a housing containing said detecting means, said signalling means and said power supply for said detector and said signalling means therein, said housing being separate from, detachably attachable to and rotatably movable on said operating condition display device to different predetermined positions with respect to said measurement scale.

2. The apparatus set forth in claim 1, wherein:
   said cooking vessel has a lid knob;
   said display device of said cooking vessel is in said lid knob of said cooking vessel; and
   said housing is detachably attachable to said lid knob.

3. The apparatus set forth in claim 2, wherein:
   said housing comprises means for movably and removably mounting said housing on said lid knob of said cooking vessel.

4. The apparatus of claim 1, wherein:
   said operating condition display device has a peripheral recess;
   said housing is contoured to fit into said peripheral recess of said operating condition display device; and
   said detecting means further comprises a projection on said housing having said light guide therein, said light guide extending in said projection above said plane of movement and directing said light guide opening toward said plane of movement of said indicator element of said operating condition display device.

5. The apparatus as set forth in claim 1, wherein:
   said housing is a ring member having a light guide member with said light guide therein projecting from said ring member and directing said light guide opening toward said plane of movement of said indicator element of said operating condition display device.

6. The apparatus of claim 1, wherein said housing is made of plastic.

* * * * *